May 5, 1936.                J. W. LEIGHTON                2,039,912
                 KINGBOLT ASSEMBLY FOR MOTOR VEHICLES
                    Filed July 22, 1933          2 Sheets-Sheet 1
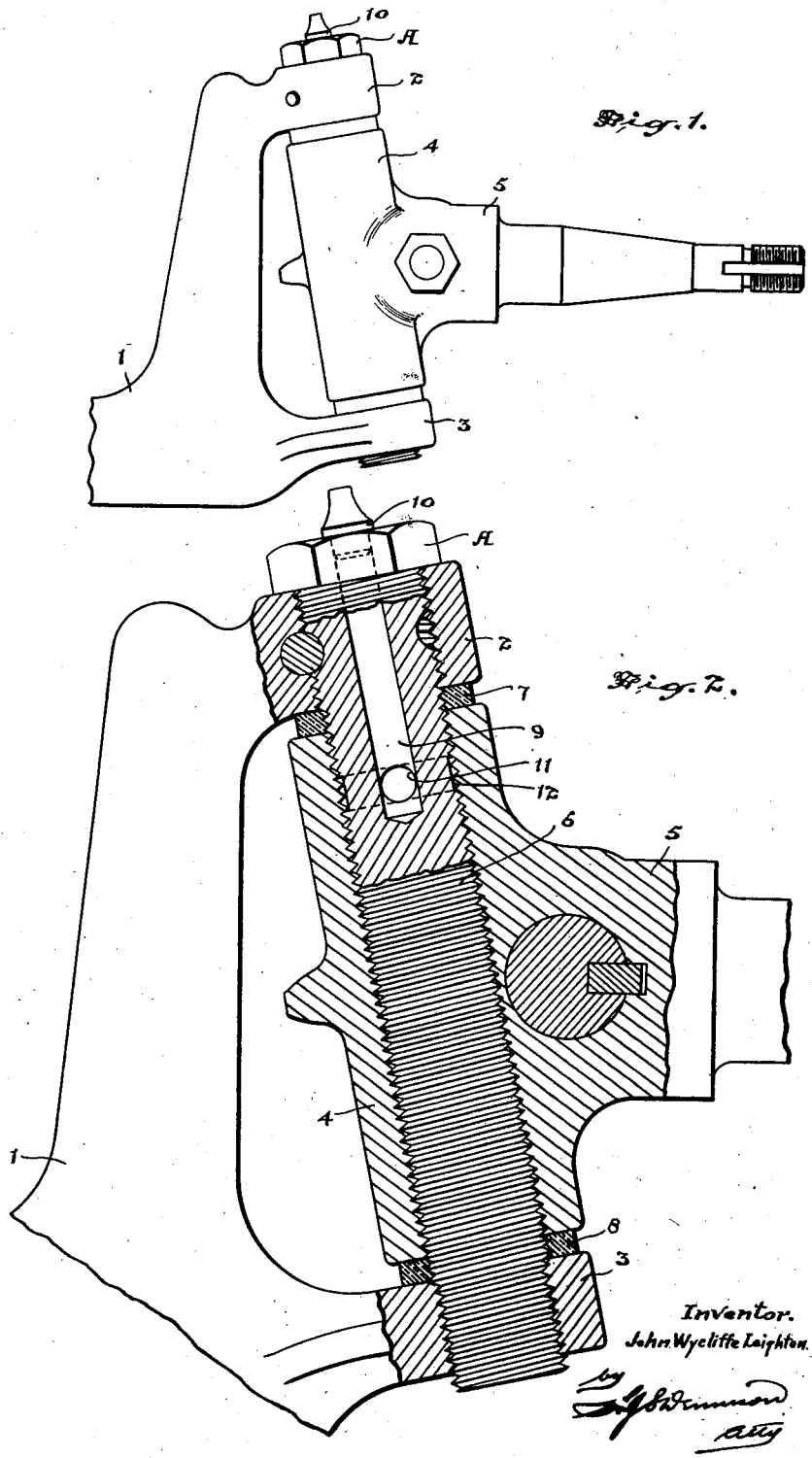
Inventor.
John Wycliffe Leighton.

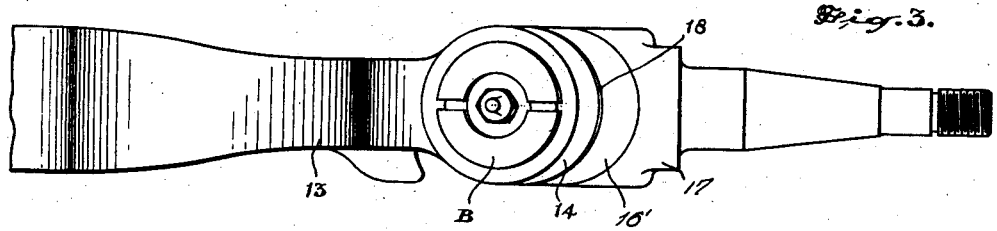
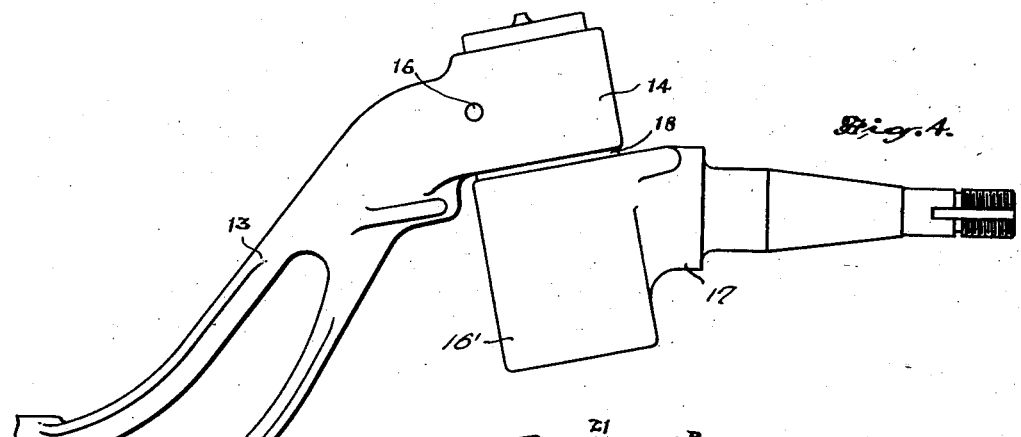
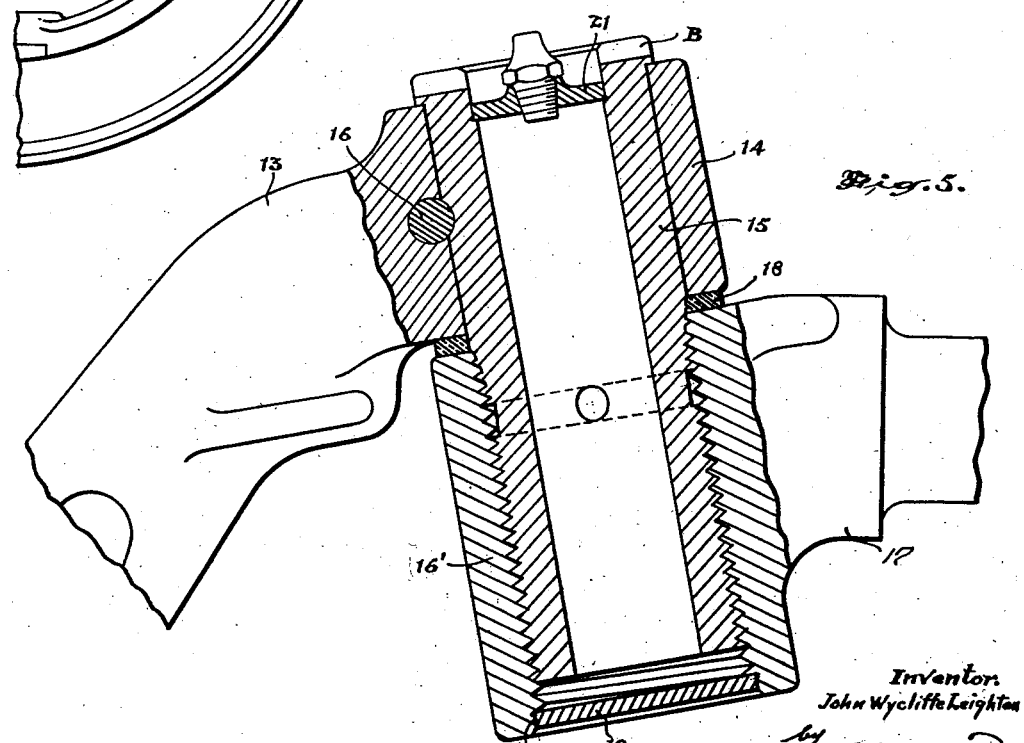

Patented May 5, 1936

2,039,912

UNITED STATES PATENT OFFICE 2,039,912

KINGBOLT ASSEMBLY FOR MOTOR VEHICLES

John Wycliffe Leighton, Port Huron, Mich.

Application July 22, 1933, Serial No. 681,674

2 Claims. (Cl. 287—100)

The principal objects of this invention are to effect the distribution of the thrust of the load over an extensive bearing surface, thereby distributing the wear and greatly increasing the life and efficiency of the knuckle joints supporting the chassis from the wheels.

A further important object is to provide a construction in which the bearing surfaces will be continuously lubricated.

A still further object is to devise a structure in which the assembling and securing of the parts in their respective positions is rendered extremely simple and inexpensive.

The principal features of the invention consist in providing the king bolt with a threaded bearing surface to engage a correspondingly threaded surface in the load supporting member and in arranging a lubricating well within the king bolt to feed lubricant to the bearing surfaces.

In the accompanying drawings, Figure 1 is an elevational view of a knuckle joint for a motor vehicle equipped with my invention.

Figure 2 is an enlarged vertical sectional view of the structure illustrated in Figure 1.

Figure 3 is a plan view of a modified structure of knuckle joint.

Figure 4 is an elevational view of the structure illustrated in Figure 3.

Figure 5 is an enlarged vertical mid-sectional view through the structure illustrated in Figure 4.

In the present practice of automotive construction the entire load of the vehicle is concentrated on extremely small areas and the lateral thrusts are distributed over the bearing surfaces of the king pin and bushings or in some cases ball bearings are arranged at top and bottom of the king pin.

According to this invention as illustrated in Figures 1 and 2 the axle 1 is formed with jaw ends, the lug ends 2 and 3 of which are formed with axially aligned threaded orifices, threaded the same pitch but the pitch diameter of one lug, preferably the upper, is larger than the other.

The sleeve portion 4 of the axle knuckle 5 is threaded internally from end to end of a pitch the same as that of the lugs but of a diameter intermediately between the jaw lugs.

The king pin 6 is threaded from end to end the pitch corresponding to the pitch of the threaded orifices of the knuckle sleeve 4 and the jaw ends 2 and 3. The end portions of the thread of the king pin which engage the jaw ends 2 and 3 are of corresponding pitch diameters to the threaded orifices therein, the upper one being preferably a jamming fit. The mid-portion of the pin thread is a bearing fit in the sleeve 4.

Felt washers 7 and 8 are preferably arranged between the lug ends 2 and 3 and the ends of the sleeve 4 to prevent the escape of oil and the ingress of dirt to the bearing surfaces.

The pin 6 is provided with a recess 9 in the upper end which leads from the top end and is closed by a suitable lubricating fitting 10.

A cross orifice 11 leads from the recess 9 to an annular recess 12 cut in the threaded wall of the pin below the top of the sleeve 4 and lubricant is fed thereby to the engaging threaded bearing surfaces of the king pin and knuckle sleeve.

By means of a construction such as described the multiplicity of thread surfaces provide both direct thrust and lateral bearing surfaces extending throughout the entire length of the king pin and as these surfaces are constantly lubricated the load is distributed uniformly over the entire length of the pin and sleeve.

The simplicity and low cost of this structure is readily apparent to those skilled in the art and a very desirable result has been achieved.

In the form of the invention illustrated in Figures 3, 4, and 5, the axle 13 is provided with an eye end 14 in which a tubular king pin 15 is secured, preferably in a driving fit and is locked with a key pin 16. The end of the pin 15 extending below the axle end is externally threaded to fit with a rotating fit in the threaded cylindrical end 16' of the knuckle 17 and a threaded bearing for the axle knuckle is provided.

A felt washer 18 is arranged between the axle and knuckle members to prevent the escape of lubricant or the ingress of dirt. A disc 19 is pressed into a recess 20 in the lower end of the threaded recess in the knuckle end and a disc 21 carrying a lubricant fitting is secured in the upper end of the king pin.

Both the king pins 4 and 15 are provided with nut shaped or slotted heads A and B to enable their being readily placed in position.

What I claim as my invention is:

1. In a king bolt assembly for motor vehicles the combination with jaw ends provided with axially aligned threaded orifices, the upper being of the same pitch but different pitch diameter from that of the bottom, a king pin threaded to fit said orifices and having a portion thereof to jam in one of said orifices and an intermediate threaded portion forming a threaded bearing surface, and a knuckle formed with a bearing threaded internally with a surface to form a threaded bearing with the central part of the king bolt, the ends of said knuckle being spaced from the jaw ends, the thread of the respective jaw and knuckle-engaging portions of said king bolt being in continuous axial formation to facilitate the threaded assembly of said elements.

2. A king bolt assembly comprising a support member formed with an eye, a king pin having an enlarged integral upper end portion jambed in said eye and having an externally threaded portion of lesser diameter than the jambed portion extending downwardly clear of said eye at an angle to the perpendicular, said respective portions being joined by a tapered threaded portion, the thread of which comprises a spiral continuation of the thread on said portion of lesser diameter, and an internally threaded steering knuckle having its threaded surfaces bearing on said reduced threaded portion of the king pin member, the tapered joining portion between said upper and lower portions of the king pin member serving to distribute the stresses and obviate fracture of said king pin at the base of said eye.

JOHN WYCLIFFE LEIGHTON.